United States Patent Office 3,828,013
Patented Aug. 6, 1974

3,828,013
CHEMICAL PROCESS FOR PREPARING ODORLESS TASTE-FREE ACRYLONITRILE/AROMATIC OLEFIN COPOLYMERS
Eric Nield, Watton-at-Stone, England, assignor to Imperial Chemical Industries Limited, London, England
No Drawing. Filed May 17, 1972, Ser. No. 254,113
Claims priority, application Great Britain, May 17, 1971, 15,265/71
Int. Cl. C08f 15/02
U.S. Cl. 260—85.5 R    6 Claims

ABSTRACT OF THE DISCLOSURE

A process is provided for the polymerisation of acrylonitrile and at least one aromatic olefine in which a substantially odourless and taste-free copolymer of acrylonitrile, containing 50 to 95% molar of units derived from acrylonitrile and 50 to 5% molar of units derived from at least one aromatic olefine, is obtained with randomly distributed units of aromatic olefine in a polymerisation mixture containing acrylonitrile and aromatic olefine and at least one alkane thiol of low volatility while adding monomer feed containing aromatic olefine and at least one alkane thiol of high volatility at a rate determined by the rate of polymerisation.

---

This invention relates to a process for making copolymers of acrylonitrile and aromatic olefines, and in particular to copolymers containing a high proportion of acrylonitrile.

Copolymers of acrylonitrile and aromatic olefine containing a high proportion of acrylonitriles and methods for making them are described in U.K. specifications 663,268 and 1,185,305. In these specifications thiols such as butane-1-thiol, octane-1-thiol and dodecane-1-thiol are used as chain transfer agents to ensure that the resulting polymer has substantially constant molecular weight and chain length. The copolymers described in U.K. specification 1,185,305 in particular may be used as films and moulded containers such as bottles for the packaging of foodstuffs and medicines. If a thiol of low volatility such as octane-1-thiol is used, then the polymer and resulting film or moulding may possess an unpleasant odour and taint any product packaged within that film or moulding unless thiol is removed. Such removal of thiol from the polymer or latices may require an expensive stripping stage in the polymerisation and may be time-consuming. Alternatively if a thiol of high volatility such as butane-1-thiol is used then the polymerisation reaction becomes slow to initiate and has a long reaction time. We have now found that substantially taste-free and odourless copolymers can be prepared by using as chain transfer agents a highly volatile and a less volatile thiol in combination.

According to the present invention, a process is provided for the polymerisation of acrylonitrile and at least one aromatic olefine in which a substantially odourless and taste-free copolymer of acrylonitrile containing 50 to 95% molar of units (preferably greater than 80% and less than 90% molar) derived from acrylonitrile and 50 to 5% molar of units derived from at least one aromatic olefine, is obtained with randomly distributed units of aromatic olefine in a polymerisation mixture containing acrylonitrile and aromatic olefine and at least one alkane thiol of low volatility while adding monomer feed containing aromatic olefine and at least one alkane thiol of high volatility at a rate determined by the rate of polymerisation.

The aromatic olefine is selected from those of the formula $CH_2{:}CR.Ar$ and also acenaphthylene, indene and coumarone. In this formula R is hydrogen or methyl and Ar is an optionally ring-substituted residue of aromatic character having not more than 3 rings and each substituent (if any) having not more than 4 carbon atoms. Examples of such olefines, include styrene, α-methylstyrene, o-methylstyrene, m-methylstyrene, p-methylstyrene, m-vinylphenol, p-trimethylsilylstyrene, 2,5-dimethylstyrene, p-methoxystyrene, 1-vinylnaphthalene, p-dimethylaminostyrene, ar-dibromostyrene, p-acetamidostyrene, 2-vinylthiophene, 3-vinylphenanthrene, 2-methyl-5-vinylpyridine and N-vinylcarbazole. The preferred composition is one in which styrene or α-methylstyrene is the predominant aromatic olefine.

The thiols which are commonly used as chain transfer agents so as to control the molecular weight of the polymer are usually alkane thiols. The alkane residue can contain up to 20 carbon atoms and primary, secondary or tertiary thiols may be used. Commonly used thiols are listed in the following table in which boiling points at atmospheric pressure are also given.

| Thiol: | Boiling point (° C.) |
|---|---|
| Methanethiol | 7 |
| Ethanethiol | 35 |
| 1-propanethiol | 68 |
| 2-propanethiol | 60 |
| 1-butanethiol | 98 |
| 2-butanethiol | 88 |
| 1-pentanethiol | 126 |
| 2-pentanethiol | 119 |
| 3-pentanethiol | 119 |
| 1-hexanethiol | 150 |
| 1-heptanethiol | 176 |
| Octanethiol (primary) | 180–210 |
| Octanethiol (secondary) | 180–190 |
| Octanethiol (tertiary) | 155–167 |
| Nonanethiol (tertiary) | 190–210 |
| 1-decanethiol | 240 |
| Undecanethiol (secondary) | 215–240 |
| Dodecanethiol (primary) | [1] 142–145 |
| Dodecanethiol (secondary) | [2] 125–130 |

[1] (15 torr).
[2] (10 torr).

Other thiols which are isomers of those listed above may also be used. In accordance with the present invention, by the term "thiol of high volatility" we mean any alkanethiol having a boiling point at atmospheric pressure of 100° C. or less and by the term "thiol of low volatility" we mean any alkanethiol having a boiling point at atmospheric pressure higher than 100° C. Preferred alkanethiols of high volatility are 1-propanethiol and 1-butanethiol, and preferred alkanethiols of low volatility are 1-octanethiol and 1-dodecanethiol.

The copolymers of the invention may be made by any means suitable for ensuring the formation of random copolymers. Owing to the great ease with which such aromatic olefines copolymerise in the presence of a high proportion of acrylonitrile, the portion of copolymer formed at the beginning of the reaction tends to be enriched with the aromatic olefine at the expense of the portion of copolymer formed at the end of the reaction; and the latter tends therefore to have the disadvantageous properties of crystalline polyacrylonitrile unless precautions are taken to feed the monomers (or at least the aromatic olefine) into the reaction medium throughout the course of the polymerisation. U.K. Patent Specification 663,268 describes a method of doing this, in which acrylonitrile and styrene or α-methylstyrene are added to an aqueous medium at the reflux temperature, the aqueous medium containing a water-soluble peroxy catalyst and a dispersing agent, and the rates of addition being such as to maintain a substantially constant reflux temperature in the aqueous medium.
U.K. Specification 1,185,305 describes a method in which the rate of addition is determined by the heat evolved by the polymerisation. The copolymer may be subsequently blended with a graft copolymer having a rubber substrate such as those described in U.K. Specification 1,143,408, 1,185,306 and 1,185,307.

The copolymer of the invention may be the superstrate of a graft copolymer having a substrate of a diene rubber. Such graft copolymers and methods for making them are described in U.K. Specification 1,185,306 in which at least part of the aromatic olefine is fed to the reaction mixture containing acrylonitrile and a diene rubber at a rate determined by the rate of polymerisation. Such a procedure can lead to the formation of a blend of the graft copolymer with a resin copolymer having the same composition as that of the superstrate of the graft copolymer. Alternatively the graft copolymer can be subsequently blended with a compatible resin.

The copolymers prepared by the method of the invention may be modified by incorporating lubricants, plasticisers, stabilisers, optical brighteners and fillers such as colloidal rubber particles or fibres such as glass, carbon and asbestos fibres before being fabricated into shaped articles.

The copolymers may be fabricated by conventional methods for shaping thermoplastic materials such as moulding, extrusion and casting into films, fibres and moulded articles such as containers. The container may be comoulded from the thermoplastic composition with any other thermoplastic material having suitable melt viscosity at the moulding temperatures such as, for example, rigid PVC in order to confer further improved physical properties on the container. The moulded container may totally enclose the contents of the container so as to form a package (such as for example a keg or a drum) or it may partially enclose the contents and be sealed in some other way, such as for example a bottle (which generally has an impermeable cap or stopper made from a material other than the composition of the bottle). The compositions can be heat-sealed if desired.

The moulded container of the package protects the contents from an environment such as air, water( including sea-water), earth or toxic or noxious gases or liquids. Conversely, the environment is protected from emissions from the contents of the package. In particular, the contents may be foodstuffs, such as for example beverages (in particular carbonated drinks where the package prevents egress of carbon dioxide and ingress of oxygen), sauces or dairy products; or they may be medicines, corrodible materials such as for example metal components or electronic apparatus, corrosive materials such as for example acids, chemicals sensitive to an environment and gases under pressure or in liquefied form (e.g. refrigerants, aerosol propellants). The package may be in the form of a large container for bulk handling or in the form of a pack for dispensing small quantities.

The copolymers of the invention are particularly useful for the packaging of foodstuffs and medicines because of the substantial absence of odour, taste and tainting of the packaged article.

The invention is illustrated by the following example.

A homogeneous copolymer of acrylonitrile and styrene was prepared using a conventional autoclave having a capacity of about 120 dm.$^3$ and fitted with a stirrer and cooling jacket. The autoclave was charged with acrylonitrile (39.1 dm.$^3$), styrene (0.45 dm.$^3$), ammonium dodecylbenzene sulphonate (1.5 kg. as 40% aqueous solution), sulphuric acid (7 cm.$^3$ of 1 normal aqueous solution) octane-1-thiol (75 cm.$^3$) and water (53.5 dm.$^3$). After purging the vessel with nitrogen, the reactants were heated to 60° C. and the initiator (aqueous 5% ammonium persulphate solution) was added gradually until the polymerisation started, 20 cm.$^3$ of initiator being used. During the reaction, more styrene containing charge transfer agent (propane-1-thiol) was added according to the heat output of the reaction as determined by the rise in temperature and flow rate of the circulating cooling water in the jacket. The heat liberated was computed from the flow rate and temperature difference electronically. The feed mixture containing 9.23 dm.$^3$ styrene and 85 cm.$^3$ propane-1-thiol was added at a rate determined by the heat liberated by the polymerisation reaction. Aqueous sodium dimethyl dithiocarbamate solution (0.025%) was added as a moderator throughout the reaction as indicated below (in dm.$^3$). The course of the reaction is shown in the following table, where the time after completing the addition of initiator is in minutes, the column headed "styrene" gives the volume in dm.$^3$ styrene and propane-1-thiol added to the reaction mixture in excess of the 0.45 dm.$^3$ of styrene added initially, temperatures of the reaction mixture are given in ° C. and "counts" represents the amount of heat liberated by the polymerisation reaction.

After 177 minutes the reaction was short stopped, excess monomers were removed by heating for 1.5 hours at 50° C. at a pressure of 71 kN/M$^2$ and the polymer was coagulated with methanol (150 dm.$^3$) at 60° C., washed four times with water (100 dm.$^3$ each was at 50–70° C.) filtered and dried in an oven with circulating air. The polymer contained 86% molar units from acrylonitrile and had a reduced viscosity of 1.0 as measured at 25° C. on a solution of the polymer in dimethyl formamide containing 0.5 g. polymer in 100 cm.$^3$ of solution.

| Time (min.) | Counts | Styrene | Temperature (° C.) Vessel | Temperature (° C.) Jacket | Total volume of moderator added (cm.$^3$) |
|---|---|---|---|---|---|
| 0 | 0 | 0 | 60.5 | 46.0 | 0 |
| 20 | 68 | 0.55 | 57.5 | 45.5 | 0 |
| 35 | 111 | 1.5 | 59.9 | 46.5 | 0 |
| 48 | 153 | 2.15 | 62.3 | 46.5 | 0 |
| 65 | 217 | 3.4 | 62.7 | 46.0 | 0.4 |
| 80 | 266 | 3.9 | 62.5 | 46.0 | 0.8 |
| 95 | 318 | 4.65 | 62.2 | 46.0 | 1.05 |
| 110 | 367 | 5.27 | 62.3 | 46.0 | 1.35 |
| 127 | 423 | 6.05 | 62.3 | 46.5 | 1.7 |
| 140 | 468 | 6.65 | 62.3 | 46.0 | 2.0 |
| 155 | 511 | 7.2 | 62.1 | 46.0 | 2.1 |
| 177 | 572 | 7.8 | 61 | 45.5 | 2.1 |

The above experiment was repeated using separately as chain transfer agents octane-1-thiol(B), propane-1-thiol(C) and dodecane-1-thiol(D) in both initial charge and styrene feed. The results together with those from the detailed example above are presented in the table from which the number of counts together with the time and styrene figures give an indication of the rate of polymerisation and conversion.

| Ref. | Time (min.) | Counts | Styrene | Acrylonitrile in copolymer (percent molar) | Reduced viscosity | Chain transfer agent Initial charge | Chain transfer agent Styrene feed |
|---|---|---|---|---|---|---|---|
| A | 177 | 572 | 7.8 | 86.0 | 1.0 | Octane-1-thiol | Propane-1-thiol. |
| B | 176 | 550 | 7.45 | 87.0 | 1.0 | Octane-1-thiol | Octane-1-thiol. |
| C | 402 | 601 | 8.36 | 85.5 | 0.92 | Propane-1-thiol | Propane-1-thiol. |
| D | 190 | 499 | 6.85 | 88.7 | 1.12 | Dodecane-1-thiol | Dodecane-1-thiol. |

Bottles were made from samples of each polymer on blow-moulding equipment manufactured by Bekum GmbH., Berlin, model BOA3. The temperature of the melt within the Bekum BOA3 varied from 180° to 185° C. at the hopper to about 200° C. at the die with a mould temperature of 60°C. The bottles had a capacity of 330 cm.$^3$ and weighed about 30 g. The bottles were evaluated for smell as prepared and on standing and also filled with water so as to determine whether there was any tainting of the water.

BOTTLE

| Ref. | Odour | | Taint to water after 7 days |
|---|---|---|---|
| | As made | On standing (1 day) | |
| A | Mercaptan smell | None | None. |
| B | Sulphury smell | Sulphury smell | Strong clinging taste. |
| C | Mercaptan smell | None | None. |
| D | Sulphury smell | Sulphury smell | Strong clinging taste. |

The results show that a copolymer of acrylonitrile and aromatic olefine (for example styrene) could be prepared in a polymerisation reaction having the short reaction time associated with the use of a chain transfer agent of low volatility but with the low odour level and low taint imparting properties of the final product associated with the use of a chain transfer agent of high volatility by using a chain transfer agent of low volatility in the initial charge and by using a chain transfer agent of high volatility in the monomer feed.

I claim:

1. A process for the polymerization of acrylonitrile and at least one aromatic olefin in which a substantially odorless and taste-free copolymer of acrylonitrile, containing 50 to 95% molar of units derived from acrylonitrile and 50 to 5% molar of units derived from at least one aromatic olefin, is obtained with randomly distributed units of aromatic olefin in a polymerization mixture containing initially acrylonitrile and aromatic olefin and at least one alkane thiol of low volatility having a boiling point at atmospheric pressure of higher than 100° C. while adding monomer feed containing aromatic olefin and at least one alkane thiol of high volatility having a boiling point at atmospheric pressure of 100° C. or less at a rate corresponding pro rata to the rate of production of heat in the copolymer formation, and the amount of the thiol of low volatility in the initial monomer charge being selected to provide copolymer having a reduced viscosity (measured on a 0.5% w./v. solution in dimethyl formamide at 25° C.) between 0.5 and 1.8 and the amount of thiol of high volatility added with the monomer feed containing aromatic olefin being selected to maintain subsequent copolymer formed within the range of 0.5 and 1.8.

2. A process according to Claim 1 in which the copolymer contains between 80% and 90% molar of units derived from acrylonitrile.

3. A process according to Claim 1 in which the aromatic olefine is selected from the group consisting of styrene and α-methyl styrene.

4. A process according to Claim 1 in which alkane thiol of low volatility has a boiling point at atmospheric pressure of at least 180° C.

5. A process according to Claim 4 in which the alkane thiol of low volatility is selected from the group consisting of 1-octane thiol and 1-dodecanethiol.

6. A process according to Claim 1 in which the alkane thiol of high volatility is 1-propane thiol.

References Cited

UNITED STATES PATENTS

| 2,434,054 | 1/1948 | Roedel | 260—85.5 N |
| 3,198,775 | 8/1965 | Delacretaz | 260—85.5 R |

HARRY WONG, Jr., Primary Examiner

U.S. Cl. X.R.

260—32.6 N, 41 A, 41 C, AG, 47 UA, 880 R, 887, 891; 264—94